US008407670B2

(12) United States Patent
Hegde et al.

(10) Patent No.: US 8,407,670 B2
(45) Date of Patent: Mar. 26, 2013

(54) COLLABORATIVE CODE CONFLICT DETECTION, NOTIFICATION AND RESOLUTION

(75) Inventors: Rajesh Hegde, Redmond, WA (US); Prasun Dewan, Chapel Hill, NC (US)

(73) Assignee: Microsoft Corporation, Redmond, WA (US)

( * ) Notice: Subject to any disclaimer, the term of this patent is extended or adjusted under 35 U.S.C. 154(b) by 1694 days.

(21) Appl. No.: 11/421,917

(22) Filed: Jun. 2, 2006

(65) Prior Publication Data

US 2007/0283321 A1 Dec. 6, 2007

(51) Int. Cl.
G06F 9/44 (2006.01)
(52) U.S. Cl. ...................................... 717/122
(58) Field of Classification Search .................. 717/122
See application file for complete search history.

(56) References Cited

U.S. PATENT DOCUMENTS

| | | | |
|---|---|---|---|
| 5,506,954 A | 4/1996 | Arshi et al. | |
| 5,617,539 A | 4/1997 | Ludwig et al. | |
| 5,717,869 A | 2/1998 | Moran et al. | |
| 5,786,814 A | 7/1998 | Moran et al. | |
| 5,854,893 A | 12/1998 | Ludwig et al. | |
| 5,890,177 A | 3/1999 | Moody et al. | |
| 5,999,208 A | 12/1999 | McNerney et al. | |
| 6,067,551 A | 5/2000 | Brown et al. | |
| 6,119,147 A | 9/2000 | Toomey et al. | |
| 6,144,991 A | 11/2000 | England | |
| 6,237,025 B1 | 5/2001 | Ludwig et al. | |
| 6,313,853 B1 | 11/2001 | Lamontagne et al. | |
| 6,332,150 B1 | 12/2001 | Khan et al. | |
| 6,351,762 B1 | 2/2002 | Ludwig et al. | |
| 6,360,236 B1 | 3/2002 | Khan et al. | |
| 6,484,196 B1 | 11/2002 | Maurille | |
| 6,507,845 B1 | 1/2003 | Cohen et al. | |
| 6,535,909 B1 | 3/2003 | Rust | |
| 6,691,162 B1 | 2/2004 | Wick | |
| 6,721,713 B1 | 4/2004 | Guheen et al. | |
| 6,738,809 B1 | 5/2004 | Brisebois et al. | |
| 6,757,893 B1 | 6/2004 | Haikin et al. | |
| 6,874,024 B2 | 3/2005 | Cohen et al. | |
| 6,968,052 B2 | 11/2005 | Wullert, II | |
| 6,993,710 B1 | 1/2006 | Coad et al. | |
| 6,993,759 B2 | 1/2006 | Aptus et al. | |
| 7,100,116 B1 | 8/2006 | Shafrir et al. | |
| 7,124,123 B1 | 10/2006 | Roskind et al. | |
| 7,266,853 B2 | 9/2007 | Kasem | |
| 7,421,470 B2 | 9/2008 | Ludwig et al. | |
| 7,464,137 B2 | 12/2008 | Zhu et al. | |
| 7,516,410 B2 | 4/2009 | Thompson et al. | |

(Continued)

OTHER PUBLICATIONS

Josephine Micallef et al., "Extending the Mercury System to Support Teams of Ada Programmers", 1991, ACM.*

(Continued)

Primary Examiner — Wei Zhen
Assistant Examiner — Lanny Ung
(74) Attorney, Agent, or Firm — Lyon & Harp, LLP; Richard T. Lyon (57) ABSTRACT

A computer code conflict notification and resolution technique that provides a collaborative programming environment for conflicts management is presented. The technique detects potential conflicts and provides facilities that allow programmers to work collaboratively to resolve the conflicts as they occur. This includes the ability to conduct a code session in which conflicting code elements are compared and changed as needed to resolve conflicts. In addition, in-place audio/video, text chat and application sharing is provided. This allows communication sessions to be conducted within the programming environment.

7 Claims, 8 Drawing Sheets

U.S. PATENT DOCUMENTS

| | | |
|---|---|---|
| 2002/0038388 A1 | 3/2002 | Netter |
| 2002/0059425 A1 | 5/2002 | Belfiore et al. |
| 2002/0075304 A1 | 6/2002 | Thompson et al. |
| 2002/0075305 A1 | 6/2002 | Beaton et al. |
| 2002/0078150 A1 | 6/2002 | Thompson et al. |
| 2002/0172339 A1 | 11/2002 | Creswell et al. |
| 2002/0174010 A1 | 11/2002 | Rice, III |
| 2004/0068505 A1 | 4/2004 | Lee |
| 2004/0261013 A1 | 12/2004 | Wynn et al. |
| 2005/0144186 A1* | 6/2005 | Hesselink et al. ............ 707/101 |
| 2005/0160395 A1 | 7/2005 | Hughes |
| 2005/0165920 A1 | 7/2005 | Kerr et al. |
| 2005/0234943 A1 | 10/2005 | Clarke |
| 2006/0089820 A1 | 4/2006 | Yu et al. |
| 2006/0101022 A1 | 5/2006 | Yu et al. |

OTHER PUBLICATIONS

Sun Microsystems, "Chapter 6: Resolving Differences Between Files", Feb 25, 2005, http://web.archive.org/web/20050225231231/http://docs.sun.com/source/806-3573/merge.html.*

Tigris.org, "Contributing source code changes with command-line CVS", , http://web.archive.org/web/20030922095111/http://www.tigris.org/nonav/scdocs/ddCVS_cvscontributing.html.*

Ben Collins-Sussman et al., "Version Control with Subversion for Subversion 1.1", Aug. 16, 2005, http://web.archive.org/web/20050816090912/http://synbook.red-bean.com/.*

Anita Sarma, "Palantir: Coordinating Distributed Workspaces", 2002, IEEE.*

John Grundy et al., "Collaborative, Integrated Software Development with Multiple Views", May 1994.*

Dwyer, T., Collaboration and modeling solutions integrate with new tools to bolster developer productivity, Yankee Group, Sep. 2005, available at http://developers.sun.com/prodtech/javatools/jsenterprise/reference/whitepapers/YankeeGroup.pdf.

Srivastava, A., J. Thiagarajan, C. Schertz, Efficient integration testing using dependency analysis, MSR-TR-2005-94, Jul. 2005.

Venolia G., Bridges between silos: A Microsoft research project, Microsoft Research Software Improvement Group, Jan. 2005.

Nghiem, M. P., Office Action, U.S. Appl. No. 10/973,186, Dec. 20, 2005.

Nghiem, M. P., Office Action, U.S. Appl. No. 11/390,895, Oct. 17, 2007.

Nghiem, M. P., Office Action, U.S. Appl. No. 11/390,895, Jun. 13, 2007.

Nghiem, M. P., Office Action, U.S. Appl. No. 11/390,895, May 8, 2006.

Booch, G., A. W. Brown, Collaborative development environments, www.jorvik.com/alanbrown/files/cde-v4.1.pdf.

Cheng, L.-T., S. Hupfer, S. Ross, J. Patterson, Jazzing up Eclipse with collaborative tools, *Proceedings of the 2003 OOPSLA Workshop on Eclipse Technology eXchange*, Anaheim, CA, 2003, pp. 45-49.

Cook, C., W. Irwin, N. Churcher, The design and use of synchronous collaborative software engineering tools, TR-COSC May 2005.

Curtis, B., H. Krasner, N. Iscoe, A field study of the software design process for large systems, *Communications of the ACM*, 1988, vol. 31, No. 11, pp. 1268-1287.

de Souza, C. R. B., D. Redmiles, L.-T. Cheng, D. Millen, J. Patterson, Sometimes you need to see through walls—A field study of application programming interfaces, *Proceedings of the 2004 ACM Conf. on Computer-Supported Cooperative Work (CSCW'04)*, pp. 63-71.

de Souza, C. R. B, D. Redmiles, P. Dourish, Breaking the code, *Moving between Private and Public Work in Collaborative Software Development* Group'03, Nov. 9-12, 2003, Sanibel Island, Florida, pp. 105-114.

Fitzpatrick, G., T. Mansfield, S. Kaplan, D. Arnold, T. Phelps, and B. Segall, Instrumenting and augmenting the workaday world with a generic notification service called Elvin, *Proc. ECSCW'99*, Copenhagen, Denmark, Sep. 1999.

Froehlich, J. P. Dourish, Unifying artifacts and activities in a visual tool for distributed software development teams, *6th Int'l Conf. on Software Eng'g (ICSE'04)*, IEEE, Edinburgh, Scotland, United Kingdom, pp. 387-396.

Gallagher, K. B., J. R. Lyle, Using program slicing in software maintenance, *IEEE Transactions on Software Eng'g*, 1991, vol. 17, No. 8, pp. 751-761.

Grinter, R. E., Recomposition: Putting It All Back Together Again, *Proceedings of ACM Conf. on Computer Supported Cooperative Work CSCW'98*, 1998, pp. 393-402.

Grinter, R. E., Using a configuration management tool to coordinate software development, *Proceedings of the Conf. on Organizational Computing Sys.*, 1995, pp. 168-177.

Gutwin, C., R. Penner, K. Schneider, Group awareness in distributed software development, *Proceedings of the ACM Conf. on Computer Supported Cooperative Workshop*, CSCW 2004, pp. 72-81.

Herbsleb, J. D., A. Mockus, T. Finholt, R. E. Grinter, Distance, dependencies and delay in a global collaboration, *Proceedings of the ACM Conf. on Computer Supported Cooperative Workshop*, CSCW 2000, Philadelphia, Pennsylvania, pp. 319-328.

Herbsleb, J. D., Atkins, D.L., Boyer, D.G., Handel, M. and Finholt, T.A., Introducing instant messaging and chat in the workplace, *Proceedings CHI 2002*, Minneapolis, USA. 2002, vol. 4, No. I, pp. 171-178.

Horowitz, S., J. Prins, T. Reps, Integrating non-interfering versions of programs, *ACM Transactions on Programming Languages and Systems*, Jul. 1989, vol. 11, No. 3, pp. 345-387.

Lozano, M., Consistency maintenance framework for collaborative software modeling tools, Dec. 10, 2003, TCD-CS-2003-58.

Minör, S., B. Magnusson, a model for semi-(a)synchronous collaborative editing, *Proceedings of the European Conference on Computer Supported Cooperative Work, ECSCW'93*, 1993, pp. 219-231.

Molli, P., H. Skaf-Molli, C. Bouthier, State treemap: An awareness widget for multi-synchronous groupware, *Proceedings of the Seventh International Workshop on Groupware*, 2001, pp. 106-114.

O'Reilly, C., P. Morrow, D. Bustard, Improving conflict detection in optimistic concurrency control models, $11^{th}$ *Int'l Workshop on Software Configuration Management*, 2003, pp. 191-205.

Perry, D. E., H. P. Siy, L. G. Volta, Parallel changes in large-scale software development: An observational case study, *ACM Transactions on Software Engineering and Methodology*, 2001, vol. 10, No. 3, p. 308-337.

Preguiça, N., J. Legatheaux Martins, H. Domingos, and S. Duarte, Data management support for asynchronous groupware, *Proc. ACM Conference on Computer-Supported Cooperative Work (CSCW'00)*, Philadelphia, PA, pp. 69-78, Dec. 2000.

Reis, C. R., R. P. de M. Fortes, An overview of the software engineering process and tools in the Mozilla project, *Proceedings of the Open Source Software Development Workshop*, Newcastle, UK, Feb. 2002, pp. 155-175.

Sarma, A., Z. Noroozi, and A. van der Hoek, Palantir: Raising awareness among configuration management workspaces, Proceedings of the Int'l Conf. on Software Eng'g, 2003, pp. 444-454.

Shümmer, T., H. M. Haake, Supporting distributed software development by modes of collaboration, *Proceedings of the Seventh European Conference on Computer Supported Cooperative Work*, 2001, pp. 79-98.

Teasley, S., L. Covi, M. S. Krishnan, J. S. Olson, How does radical collocation help a team succeed?, Proceedings of the Conference on Computer Supported Cooperative Work, 2000, pp. 339-346.

Miller, Alan S., Office Action, U.S. Appl. No. 10/973,185, Dec. 24, 2008.

Miller, Alan S., Office Action, U.S. Appl. No. 10/973,185, May 27, 2009.

Vu, Tuan A., Office Action, U.S. Appl. No. 11/428,080, Jun. 23, 2010.

* cited by examiner

COLLABORATIVE CODE CONFLICT DETECTION, NOTIFICATION AND RESOLUTION

BACKGROUND

Software is often developed by a team of programmers, rather than an individual. This is especially true for complex software programs. In these team-based development projects, it is known that a large number of concurrent changes are often made to the same file, and even the same line, by different programmers over the course of the project. A correlation has been found between the amount of this concurrent activity and defects in a file, despite the use of state of the art version control, validation and testing mechanisms to find and fix conflicting changes.

One way of addressing this conflict issue is to foster an increase in collaboration and related communication among the members of the project team. However, collaboration among team members is often difficult to achieve, even for a team that is co-located. It is even a greater challenge when the project team is geographically and/or temporally dispersed, as is often the case.

Collaboration between team members can be increased using a communication network and computer-based integrated development environment (IDE) tools. These types of tools operate across a network in a distributed fashion on each team member's computer, and allow the project team members to communicate with each other while working on a software project. However, these existing tools have several limitations. For example, conflicts are detected when a programmer checks-in a set of changes, not when the changes are made. In addition, when two users make conflicting changes, the person "checking in" later to a version control system is responsible for repairing the conflict, even though it might be more efficient for the earlier person to make the required changes. Still further, existing version control systems are typically text-based and conflicts are detected and repaired at the line level.

SUMMARY

The present computer code conflict notification and resolution technique detects potential conflicts and provides facilities that allow programmers to work collaboratively to resolve the conflicts in a network-based environment at the time the conflicts occur. It is not necessary to wait until code is checked-in to discover the conflicts—if indeed they are even apparent at that point. In regard to conflict detection and notification, a list of program elements associated with a software development project is maintained. More particularly, this is a list of program elements that have been previously edited by a programmer. It is noted that a program element can be a file, type (e.g., either a class or interface) or method. The network is monitored for incoming edit messages and they are input when received. An edit message is a message sent whenever a programmer begins changing a program element. It identifies the element being changed. When an edit message is received from another programmer, it is determined if it identifies one of the program elements found in the list of edited elements. If it is found on the list, the programmer receiving the edit message and the programmer who sent the message are both notified that a potential conflict exists.

In addition, a list of program elements that are related to the elements found on the list of edited elements can be maintained. Program elements are considered related when a dependency exists between them and this dependency is not too far removed from the edited element. If the related elements list is maintained, it is determined if a received edit message identifies a program element that is related to an edited program element. Whenever the edit message identifies a program element that is related to an edited program element, the programmer receiving the edit message and the programmer who sent the message are notified that a potential conflict exists between these elements.

In regard to conflict resolution, the present technique employs a graphical user interface (GUI) to display program elements to a programmer that have been deemed to be in a potential conflict with each other. In this way the programmer can work with the other, remote programmer involved in the conflict, to resolve the conflict. This is facilitated by in-place communication tools and the ability to make changes to the displayed program elements during a code session. In a code session, changes to the displayed program elements made by either programmer involved in a potential conflict can be input and used to update the elements.

It is noted that while the foregoing limitations in existing integrated development environment (IDE) tools described in the Background section can be resolved by a particular implementation of a computer code conflict notification and resolution technique according to the present invention, this is in no way limited to implementations that just solve any or all of the noted disadvantages. Rather, the present technique has a much wider application as will become evident from the descriptions to follow.

It should also be noted that this Summary is provided to introduce a selection of concepts, in a simplified form, that are further described below in the Detailed Description. This Summary is not intended to identify key features or essential features of the claimed subject matter, nor is it intended to be used as an aid in determining the scope of the claimed subject matter. In addition to the just described benefits, other advantages of the present invention will become apparent from the detailed description which follows hereinafter when taken in conjunction with the drawing figures which accompany it.

DESCRIPTION OF THE DRAWINGS

The specific features, aspects, and advantages of the present invention will become better understood with regard to the following description, appended claims, and accompanying drawings where:

DETAILED DESCRIPTION

In the following description of embodiments of the present invention reference is made to the accompanying drawings which form a part hereof, and in which are shown, by way of illustration, specific embodiments in which the invention may be practiced. It is understood that other embodiments may be utilized and structural changes may be made without departing from the scope of the present invention.

1.0 The Computing Environment

Before providing a description of embodiments of the present code conflict notification and resolution technique, a brief, general description of suitable computing environments in which portions thereof may be implemented will be described.

The present code conflict notification and resolution technique operates on a collaborative integrated development environment (IDE) system. This system when enhanced by the present technique combines presence information, activity awareness information and interactive communication tools into a single environment that serves as a virtual software development complex for members of a development project team. The IDE system operates over a communications network (such as an intranet or the Internet) in a distributed fashion. Members of the project team perform their development activities using the IDE system.

Figure 1:
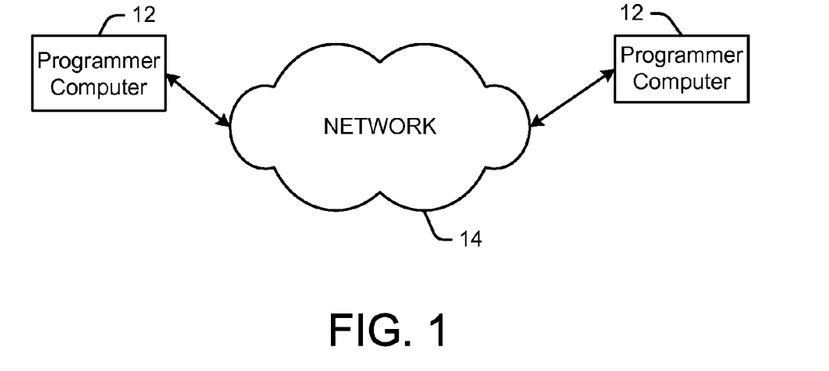
FIG. 1 is a diagram illustrating a simplified networked computing environment for use in implementing various embodiments of the present invention.

In regard to the foregoing communications network, FIG. 1 is a diagram of a sample environment 10 in which the present code conflict notification and resolution technique can be implemented. The exemplary communications network environment 10 includes multiple programmers' computers 12, two of which are shown. One possible communication between programmer's computers 12 may be in the form of a data packet adapted to be transmitted between two or more computer processes. The environment 10 includes a communication network 14 that can be employed to facilitate communications between the programmer's computers 12.

In regard to the foregoing computing devices used by project team members, the present code conflict notification and resolution technique is operational with numerous general purpose or special purpose computing system environments or configurations. Examples of well known computing systems, environments, and/or configurations that may be suitable include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Figure 2:
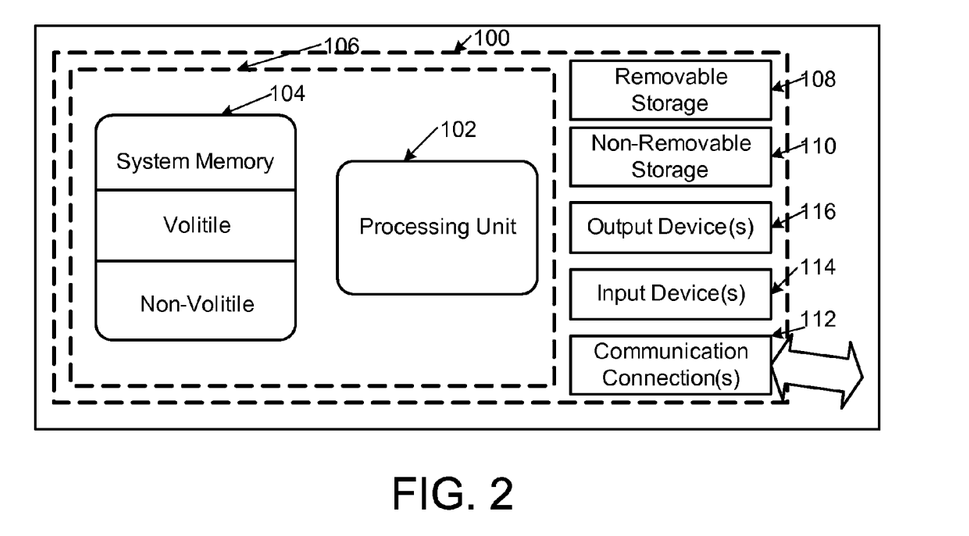
FIG. 2 is a diagram depicting a general purpose computing device constituting an exemplary system for implementing various embodiments of the present invention.

FIG. 2 illustrates an example of a suitable computing system environment. The computing system environment is only one example of a suitable computing environment and is not intended to suggest any limitation as to the scope of use or functionality of the present code conflict notification and resolution technique. Neither should the computing environment be interpreted as having any dependency or requirement relating to any one or combination of components illustrated in the exemplary operating environment. With reference to FIG. 2, an exemplary system for implementing the present code conflict notification and resolution technique includes a computing device, such as computing device 100. In its most basic configuration, computing device 100 typically includes at least one processing unit 102 and memory 104. Depending on the exact configuration and type of computing device, memory 104 may be volatile (such as RAM), non-volatile (such as ROM, flash memory, etc.) or some combination of the two. This most basic configuration is illustrated in FIG. 2 by dashed line 106. Additionally, device 100 may also have additional features/functionality. For example, device 100 may also include additional storage (removable and/or non-removable) including, but not limited to, magnetic or optical disks or tape. Such additional storage is illustrated in FIG. 2 by removable storage 108 and non-removable storage 110. Computer storage media includes volatile and nonvolatile, removable and non-removable media implemented in any method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 100. Any such computer storage media may be part of device 100.

Device 100 may also contain communications connection(s) 112 that allow the device to communicate with other devices. Communications connection(s) 112 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Device 100 may also have input device(s) 114 such as keyboard, mouse, pen, voice input device, touch input device, camera, etc. Output device(s) 116 such as a display, speakers, printer, etc. may also be included. All these devices are well know in the art and need not be discussed at length here.

The present code conflict notification and resolution technique may be described in the general context of computer-executable instructions, such as program modules, being executed by a computing device. Generally, program modules include routines, programs, objects, components, data structures, etc. that perform particular tasks or implement particular abstract data types. The present code conflict notification and resolution technique may also be practiced in distributed computing environments where tasks are performed by remote processing devices that are linked through a communications network. In a distributed computing environment, program modules may be located in both local and remote computer storage media including memory storage devices.

The exemplary operating environment having now been discussed, the remaining parts of this description section will be devoted to a description of the program modules embodying the present code conflict notification and resolution technique.

2.0 Computer Code Conflict Notification and Resolution Technique

The present code conflict notification and resolution technique generally provides a collaborative programming environment that supports conflict management. In a typical software development project, the software design is architected into modules, each module performing a particular set of functions related to the overall functionality of the product. Project team members are assigned responsibility to develop computer code that implements the functionality for each of the modules. In the development process, team members write code, compile and build the code, test and debug the code, and submit their code to a common source code control system (SCCS). The process of submitting code into an SCCS is commonly termed "checking in" the code. At times during the development process, multiple team members may unknowingly be working on the same or a related file, type (e.g., class or interface) or method within a module. This can cause significant problems when, for example, the changes made by one programmer conflict with those made by another programmer.

As an example of such a conflict, consider a software development project for a drawing tool. Assume that the current version of the project contains an abstract class, AShapeWithBounds, which represents a geometric shape with rectangular dimensions. The class declares four variables, x, y, width and height, which define the location and size of the shape. It also has the following constructor to initialize the variables:

```
public AShapeWithBounds (int initX, int initY,
                         int initHeight, int initWidth) {
    x = initX;
    y = initY;
    height = initHeight;
    width = initWidth;        }
```

Assume a first programmer is the one who created and checked-in this class. A while after doing so, the programmer realizes that the positions of the height and width parameters should be reversed. Therefore, the first programmer has checked-out the class from the SCCS and is about to correct the ordering. In the meantime, a second programmer in the project team is adding a new subclass of AShapeWithBounds, called ALine, in a separate file. The constructor of the new subclass will call the constructor of the AShapeWithBounds class to initialize the coordinates and size of the bounding box of the line. As a result, the two activities conflict with each other. It will be assumed that the programmers are unaware of each other's tasks and thus do not know they conflict. As the second programmer is unaware of the first programmer's change of mind, the ALine constructor follows the parameter order of the base class constructor in the original version, i.e.,

```
public ALine(int initX, int initY, int initHeight, int init-
   Width)
:base (initX, initY, initHeight, initweight) { }.
```

This code will not work correctly with the first programmer's new version of the base class constructor. When the version control system is relied upon to coordinate changes, the earliest point at which a conflict can be detected is when a change is checked-in for validation and testing. As the foregoing changes occur in two different files, the version control system, in fact, cannot detect the conflict. In addition, as the original and changed constructors have the same signature, ALine, will compile correctly with the new version of AShapeWithBounds, and thus a build will also not catch the conflict. If appropriate testing is not done, the error may not be detected prior to release of the code.

It is noted that this example is intended to aid in the understanding of the features provided by the present technique. However, it is not intended to imply that the present technique is limited to the example scenario. Rather, as will become apparent, the present technique can be employed in any type of software development project.

The present code conflict notification and resolution technique provides a way to identify and collaboratively handle conflicts. More particularly, the present technique detects potential conflicts and provides facilities that allow programmers to work collaboratively to resolve the conflicts prior to check-in or testing. These facilities include, but are not limited to, providing awareness at granularity smaller than the file (e.g., type and method); using both method and type dependencies to determine if programmers are editing related code; and allowing a programmer to view and import other programmers' versions of a file, type or method. In addition, in-place audio/video, text chat and application sharing can be provided. This allows communication sessions to be conducted within the programming environment. The foregoing features, as well as others, will now be described in more detail starting with the notification aspects followed the resolution aspects.

2.1 Conflict Notification

Figure 3:
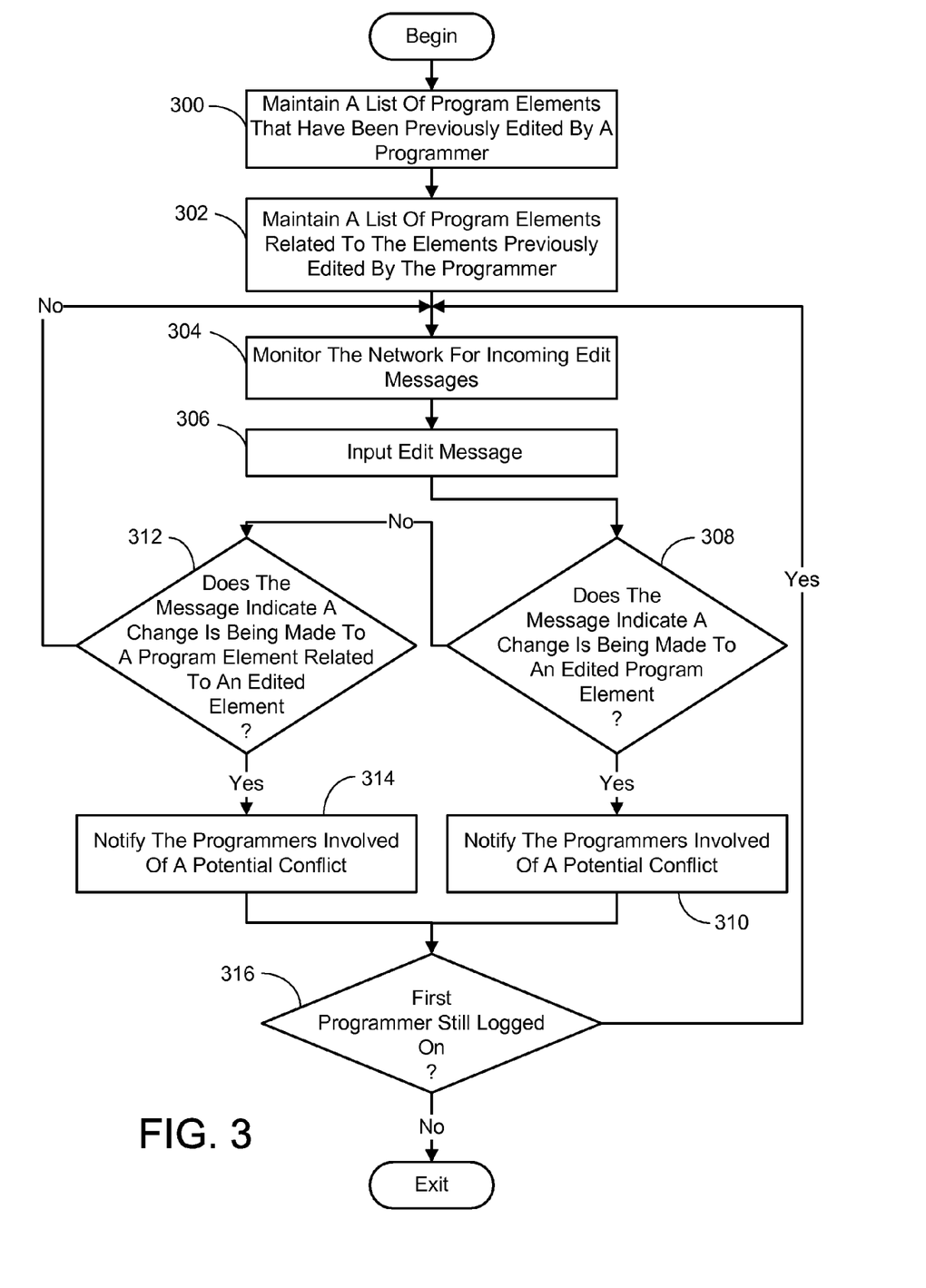
FIG. 3 is a flow diagram generally outlining one embodiment of a process for detecting conflicts and notifying the cognizant programmers of the conflict in accordance with the present computer code conflict notification and resolution technique from the perspective of a programmer who previously edited a program element in a software development project.

FIG. 3 generally outlines one embodiment of the present code conflict notification and resolution technique as it applies to a programmer who has "logged-on" to the aforementioned IDE system and edited a program element, but not yet checked-in the change in for validation and testing. Another programmer may want to edit the same element, or perhaps create or edit a program element that is related to the previously changed element. As the change was not check-in, the second programmer may not know about it. Generally, the technique involves maintaining a list of program elements associated with a software development project that have been previously edited by a programmer (300). In one embodiment, the list contains only elements that were edited but not yet checked-in for validation and testing. It is noted that a program element can be a file, type (e.g., either a class or interface) or method. If related program elements are to be considered as well, the technique additionally involves maintaining a list of such related program elements (302). A program element generally relates to an edited program element if a dependency exists between them and this dependency is not too far removed from the edited element. This concept will be described in more detail later.

The technique continues by monitoring the aforementioned network for incoming edit messages (304) and inputting any messages received (306). Edit messages are generated whenever another programmer begins changing a program element. Generally, they identify the program element that is being changed. Whenever an edit message is received, it is determined if the message indicates a change is being made to a program element previously edited by the first programmer (308). This is done using the aforementioned list of edited program elements. If the edit message indicates a change is being made to such an edited program element, the first and second programmers are notified of a potential conflict (310). If not, and related program elements are considered as well, it is also identified whether the edit message concerns a program element that is related to an element previously edited by the first programmer (312). This is accomplished using the aforementioned related program elements list. If the edit message concerns a program element that is related to an edited program element, then the first and second programmers are notified of a potential conflict between the edited program element and the program element identified in the edit message (314). It is next determined if the first programmer is still logged on the IDE system (316). If so, actions 304 through 316 are repeated. Otherwise, the technique comes to an end.

It is noted that in the case where a programmer is creating a new program element, rather than editing an existing one, an edit message is still sent.

It is also noted that the foregoing technique can also be implemented without related program elements being considered. In this alternate technique, the actions associated with processing related program elements would be eliminated.

It is further noted that each programmer sets the granularity of detection. In other words, the programmer chooses whether to be notified about potential conflicts in files, types and methods; types and methods only; or methods only. Thus, for example, if a programmer chooses to be notified about potential conflicts in methods only, and a conflict arises in a portion of a file or class that is not a method, then no notification would be given. On the other hand, if a programmer elects to be notified about potential conflicts in files, types and methods, the programmer would be notified about any potential conflict that might arise. However, if more than one program element level is chosen, and an edit causes a potential conflict at more than one granularity, then the programmer is notified only about a potential conflict at the finest granularity level affected. Thus, if the programmer has chosen to be notified of potential conflicts in all three program element levels and a potential conflict arises in a method within a class of a file, the programmer would only be notified that a potential conflict exists in a method. In this way the system avoids multiple conflict messages for the same conflict.

In regard to notifying the programmers of a potential conflict, the first programmer in the foregoing example, is a local user (i.e., the team member using a computing device performing the foregoing technique), and so is notified directly. In the case of the remote, second programmer in the foregoing example, he or she is notified by sending a conflict message via the network. The conflict message identifies that a potential conflict exists between the first programmer's version of a program element and the other programmer's version of the program element, when the other programmer is editing the same program element; or if related program elements are considered, that a potential conflict exists between the program element edited by the first programmer and a related program element identified in the edit message.

Figure 4:
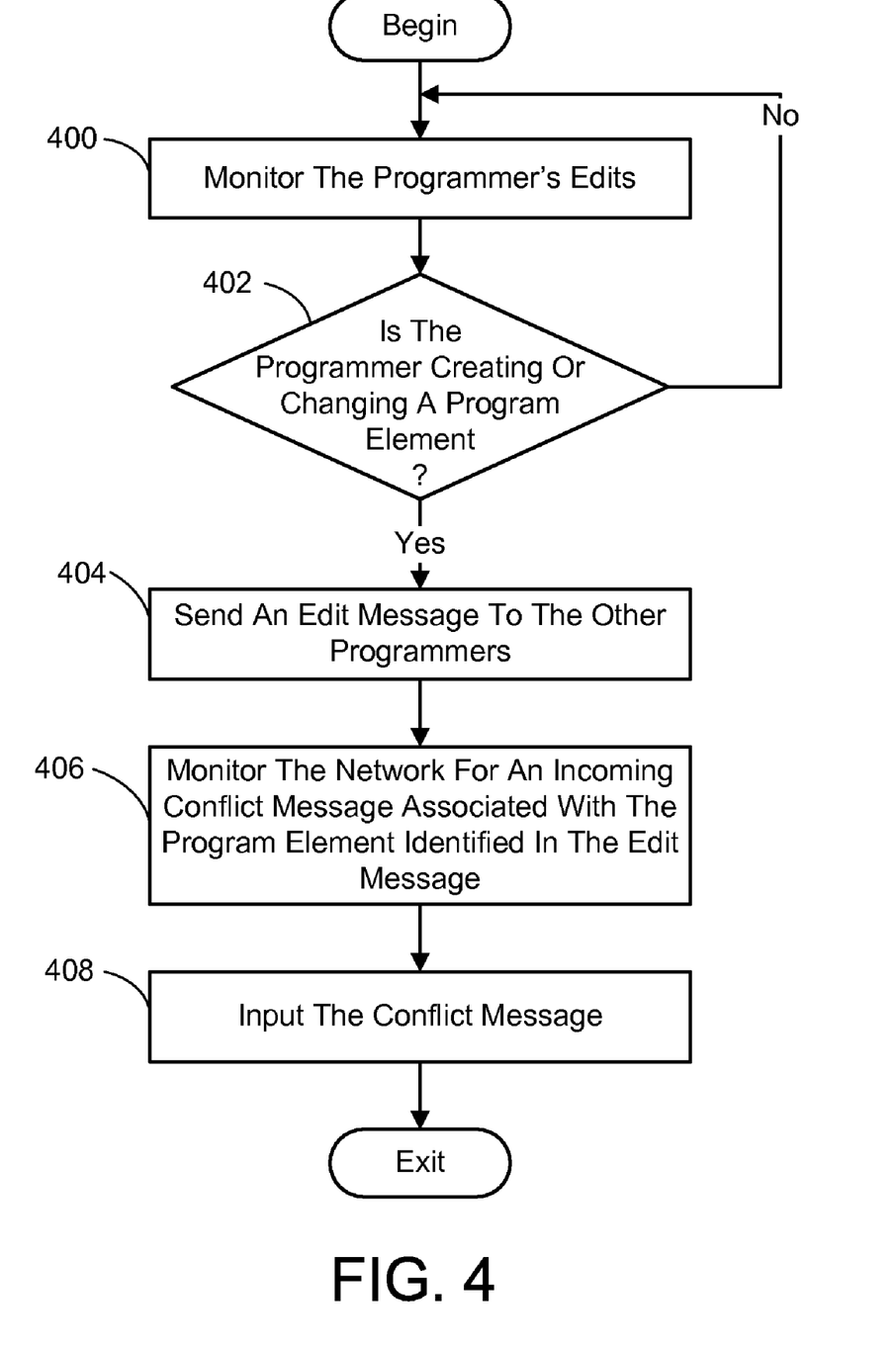
FIG. 4 is a flow diagram generally outlining one embodiment of a process for detecting conflicts and notifying the cognizant programmers of the conflict in accordance with the present computer code conflict notification and resolution technique from the perspective of a programmer who is currently editing a program element in a software development project.

FIG. 4 generally outlines one embodiment of the present code conflict notification and resolution technique as it applies to a programmer who has "logged-on" to the IDE system and begins to create or edit a program element. In this case, the other team members need to be notified if the new or modified element affects a program element they previously edited. More particularly, the technique involves monitoring a programmer (400) and determining if that programmer is creating or changing a program element associated with the software development project (402). If so, an edit message is sent via the network to the other team members (404). As described previously, this edit message identifies the program element that is being changed; or in the case of an element being created, the edit message identifies the element and the existing elements that are related to it. The technique then continues by monitoring the network for an incoming conflict message associated with the program element identified in the edit message (406) and inputting any such messages received (408).

It is noted that if a conflict message associated with the program element identified in the edit message is not received, then the new or modified element takes on the status of one of the aforementioned edited program elements for the programmer creating or editing it.

In regard to related program elements, it was stated previously that elements relate to one another when a dependency exists between them and this dependency is not too far removed from the edited element. More particularly, a type can depend on subtype or supertype, and a method can depend on a method it is called by or calls. By way of an example of a type dependency, consider three classes: A, B and C as defined below.

```
Public class A
{
    :
}
Public class B : A
{
}
Public Class C
{
Private B theB;
}
```

Class B derives from class A, and class C has an instance of class B as its member. Therefore, class A and B are related through inheritance while class C and B are related through membership.

By way of an example of a method dependency, consider a method that calls another. In this example, the called method is defined as,

```
Public void DrawRectangle( int width, int height )
{
    :
    :
}
``` and the calling method is defined as,

```
Public void DrawShapes( )
{
Int w = 10;
Int h = 30;
DrawRectangle ( 10, 30 )
}
```

Thus, the method Public void DrawShapes is related to the method Public void DrawRectangle, as the former call the latter.

These dependencies can extend recursively beyond one level. For example, a subtype may have another subtype of its own, or a called method may in turn call another method. Thus, there is a depth of dependency to consider when determining if an edited program element is related to another element. More particularly, the present code conflict notification and resolution technique can include a function that sets the number of levels away from an edited program element that would still be considered a related element. This depth of dependency limit can be a default value, or as will be described shortly, set by a programmer.

2.2 Conflict Resolution

Figure 5:
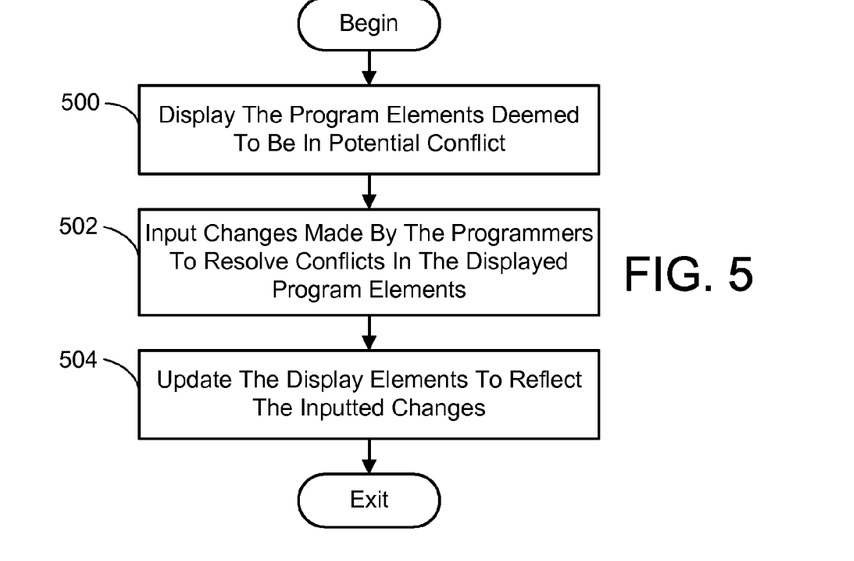
FIG. 5 is a flow diagram generally outlining one embodiment of a process for resolving conflicts in accordance with the present computer code conflict notification and resolution technique using a code session.

At this point, the programmers receiving notification of a potential conflict only know that a conflict might exist. To determine if an actual conflict exists, a comparison must be made by one or both of the programmers involved in the conflict. The present code conflict notification and resolution technique facilitates this comparison by causing program elements involved in the conflict to be displayed to a programmer in a "code session". The details of this display feature will be described in more detail later in connection with a description of an exemplary graphic user interface associated with the present technique. Generally, each of the programmers involved in a potential conflict will be notified, and each has the option of starting a code session to see a comparison of the program elements. Referring to FIG. 5, procedurally the code session generally involves displaying program elements that have been deemed to be in a potential conflict to a programmer (500); inputting changes made by the programmers to resolve any actual conflict in the displayed program elements (502); and finally, updating the displayed elements to reflect the inputted changes (504).

Figure 6:
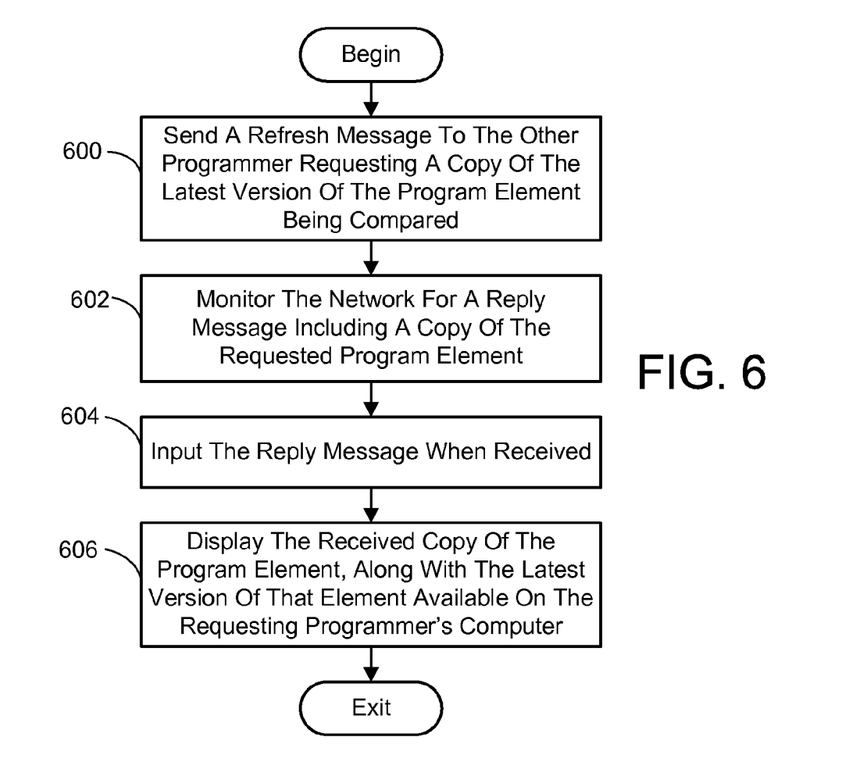
FIG. 6 is a flow diagram generally outlining one embodiment of a process for obtaining a copy of the other programmer's version of a program element under consideration in a code session.

Displaying program elements that have been deemed to be in a potential conflict can be accomplished in different ways. In one embodiment of the present technique, a programmer has the option of viewing the last-updated version of the other programmer's program element involved in the conflict and comparing it to the latest version of that element available on the programmer's computer (which may simply be the last checked-in version of the program element). A programmer initiating a code session also has the option of viewing the latest version of the conflicting program elements that he or she is responsible for, and comparing it to the version the other programmer is working with. It is noted that initially each of the programmers has a current copy of the program element that he or she is responsible for. However, each will need a copy of the version of that program element that the other programmer is working with. In one embodiment of the present technique, when a programmer initiates a code session, the copy of the other programmer's version of the element under consideration is automatically obtained using a refresh feature. More particularly, referring to FIG. 6, in one implementation of this feature, when a programmer initiates a code session, a refresh message is sent to the other programmer requesting a copy of the latest version of the program element being compared that the other programmer has available (600). The network is then monitored for a reply message that includes a copy of the requested program element (602) and it is input when received (604). The received copy of the program element is then displayed, along with the latest version of that element available on the requesting programmer's computer (606).

Once the potentially conflicting program elements are displayed to the programmers, they can collaboratively resolve any real issue that exists. As stated earlier, several communication tools are available to accomplish this task, such as in-place audio/video, text chat and application sharing. In some cases, a programmer may decide to change his or her program element to conform to the other programmer's element, with or without employing any of the foregoing communication tools. As an example, consider the drawing tool example described previously. The second programmer could change the constructor parameters of his or her program element to match the order change in the first programmer's earlier-changed element. It is noted that when the edit message concerning this correction is received by the other programmer involved in a potential conflict, a conflict notification is not generated as the conflict is already being addressed.

It is also noted that the other programmer may be changing the program element involved in the first programmer's code session at the same time—perhaps as a result of a discussion in a concurrent communication session (for example, via the in-place audio/video, text chat and application sharing tools) and/or after viewing the potentially conflicting program element in his or her own code session. Thus, the first programmer will not be viewing the latest version of the program element being compared, and may need to in order to correctly resolve the conflict. In addition, the programmer may have made changes to his or her own version of the program element displayed in the code session. In such a case, the programmer can retrieve the other programmer's latest version of the program element under consideration, and display that current version, as well as the latest version of his or her copy of the program element, by manually initiating the aforementioned refresh feature.

As stated earlier, each of the programmers involved in a potential conflict will be notified, and has the option of starting a code session to see a comparison of the conflicting program elements. However, an edit message will typically be sent before a programmer has finished creating or editing a program element. Thus, a conflict notification could be sent prior to the programmer finishing the changes as well, if the changes affect (either directly or indirectly by dependency) a program element previously edited by the other programmer. A code session cannot be initiated if the program element to be displayed and compared is the one still being worked on by a programmer. In one embodiment of the present technique, this situation can be handled by delaying the sending of a conflict notification until after the programmer is finished creating or editing a program element that was the subject of an edit message. Thus, the changes will be complete and a code session can be initiated. In one implementation of this delay feature, the number of program elements a programmer edits is tracked and the conflict notification is delayed until a prescribed number of edits has been complete. For example, if the prescribed number is one edit, the notification would be delayed until after each edit is complete. The prescribed number of edits could be a default number or programmer-specified.

Figure 7:
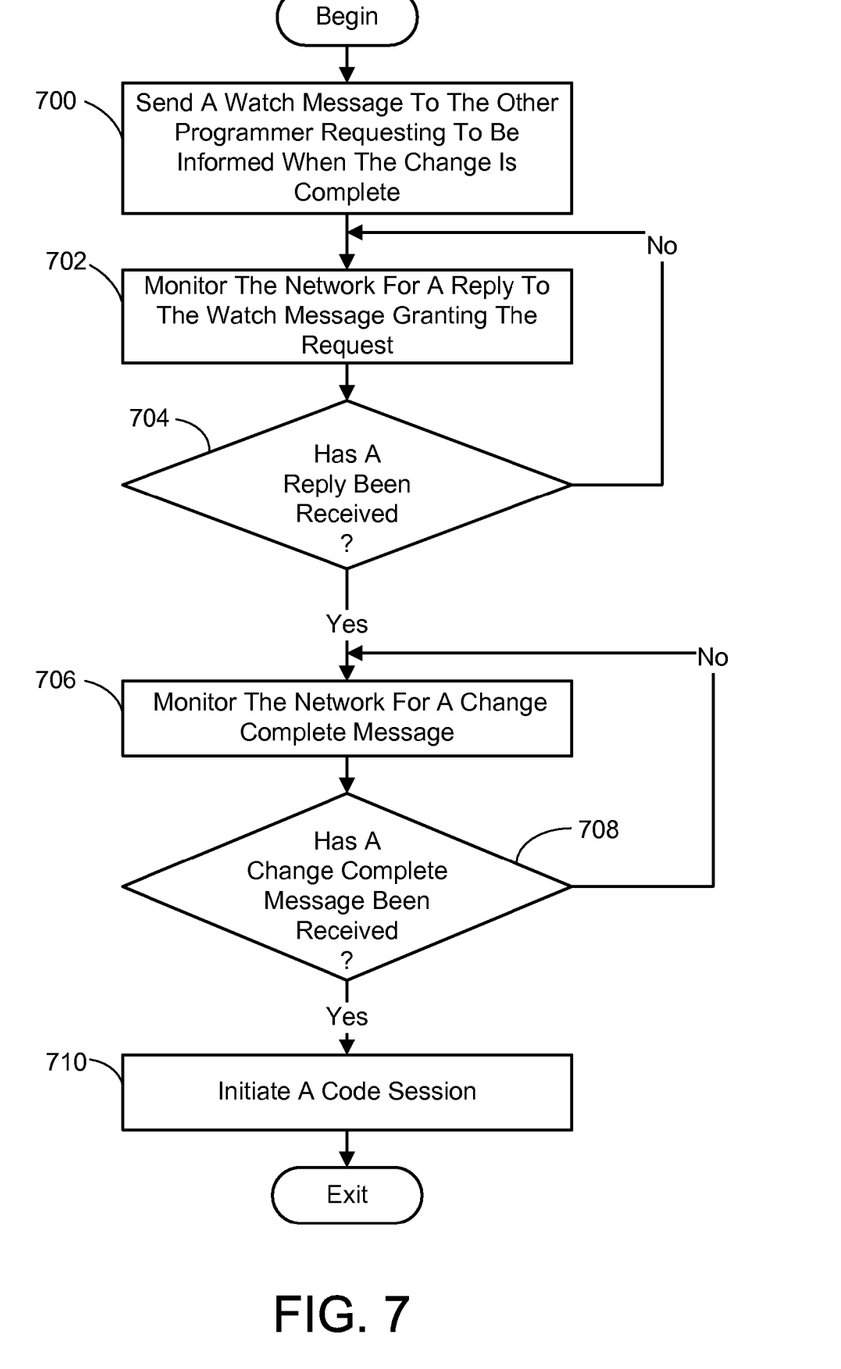
FIG. 7 is a flow diagram generally outlining one embodiment of a process for initiating a watch that monitors the programmer who has yet to complete the edits on a program element involved in a potential conflict and informs the watching programmer when the edits are complete.

In another embodiment of the present technique, the early notification issue is handled by setting a watch. Generally, the conflict notification is not delayed, and instead a watch monitors the programmer who has yet to complete the edits on a program element involved in a potential conflict and informs the "watching" programmer when the edits are complete. More particularly, referring to FIG. 7, in one implementation of the watch feature, after receiving a notification of the potential conflict caused by a change being made by the other programmer, but which is not yet complete, a watch message is sent to the other programmer requesting to be informed when the change is complete (700). The watching programmer's computer then monitors incoming messages for a reply to the watch message (702) and determines if such a reply is received (704). If a reply message is received from the other programmer granting the request, the watching programmer's computer then monitors incoming messages for a change complete message (706) and determines if this message is received (708). When the change complete message is received, a code session is initiated (710) as described previously. It is noted that the present code conflict notification and resolution technique running on the other programmer's computer deems that the programmer has finished editing a program element when he or she begins editing a different element. However, in an alternate implementation of the watch feature, when a programmer sets a watch, a prescribed amount of time is allowed to pass, and then the programmer is informed that the watch period is over. The programmer can then attempt to initiate a code session assuming the other programmer is finished editing the program element under consideration.

Another feature of the present code conflict notification and resolution technique involves preparing a program element for testing. When a programmer wishes to test a modified program element, the changes made to the element will typically assume the other programmer's program element is its most up-to-date form. However, while the latest copy of the other programmer's program element may be displayed in a code session, this version is generally not accessible for testing purposes, and needs to be updated. Thus, the changes have to be incorporated before any testing can take place. To handle this situation, the present technique includes a feature whereby a programmer initiates a replacing or merging of the old version with the current, changed version as seen in the code session. Replacing an outdated version of another programmer's program element with the current version displayed in the code session can be used when this action would have no effect on the changes made by the programmer initiating the replacement. For example, a replacement action is appropriate when the two program elements involved are related, but not the same element, or when the programmer has not made any changes to his or her version of the program element during the code session. In the case where the elements are the same and changes have been made to the programmer's version of the program element being tested, a replacement action may not be advantageous as any changes made by the programmer initiating the replacement could be lost. Instead, a merge action is employed. This merge action replaces all the portions of the version of the program element being tested, which will included any changes made by the testing programmer during the code session, that have not been changed by that programmer. In this way, the changes made by the other programmer are incorporated into the merged element, without eliminating any changes to the element made by the programmer who initiated the merge action.

3.0 Exemplary Graphic User Interface

This section will describe an exemplary graphic user interface (GUI) that can be employed in conjunction with the present code conflict notification and resolution technique, and will provide an operational example of the technique. It is noted that this GUI and operational example are intended to aid in the understanding of the features provided and is not intended to imply that the present invention is limited to the example.

3.1 Conflict Notification and Resolution Window and Notification Setup

Figure 8:
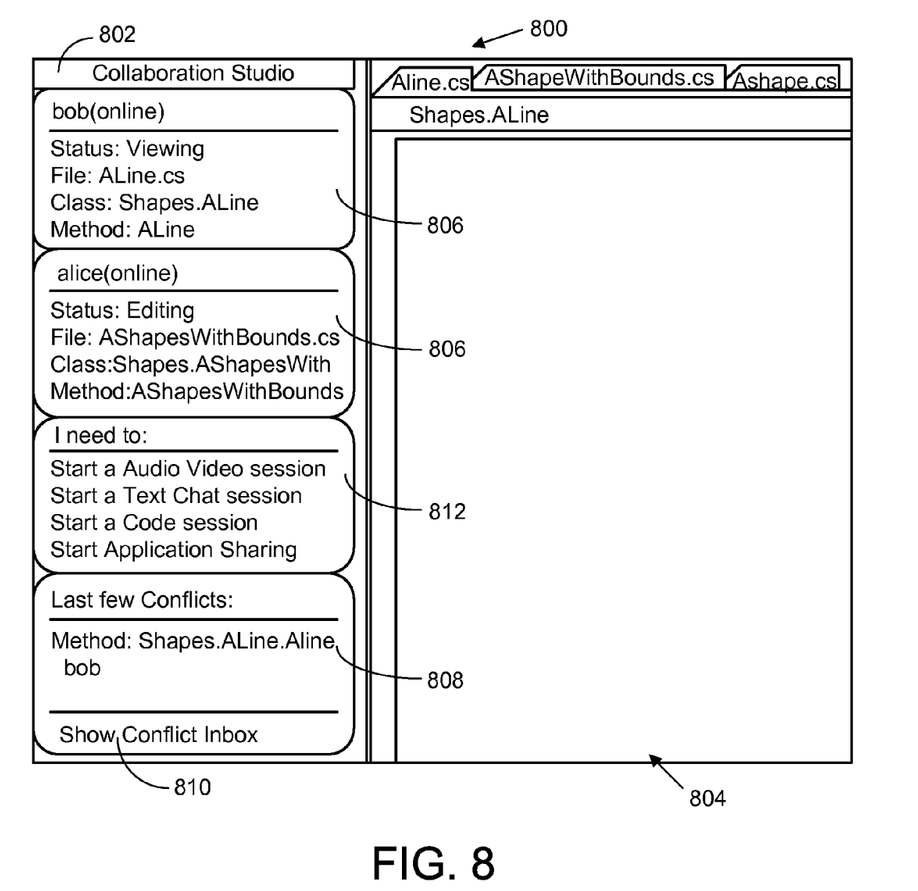
FIG. 8 is a diagram representing an exemplary conflict notification and resolution window that can be used as a graphical user interface for implementing the present computer code conflict notification and resolution technique.

In general, the example GUI shown in FIG. 8 is conflict notification and resolution window 800 that includes a special panel, referred to as a collaboration studio panel 802, and a workspace sector 804 where the text of program elements and various sub-windows are displayed. The collaboration studio panel 802 is divided into several sub-panels or tiles. There is a user-tile 806 for each of the programmers involved in the software development project. A user-tile 806 shows the log-in name of the programmer, whether the programmer is online, and the program element which the programmer is focusing (e.g., the program element displayed in the workspace sector that the cursor currently appears in), and status of the current activity (e.g., editing, viewing or debugging). Thus, it can be seen in the example of FIG. 8 that a programmer named Bob is viewing a method ALine of the class Shapes.ALine in the file ALine.cs, while another programmer named Alice is editing the method AShapeWithBounds in the class Shapes.AShapeWithBounds in the file AShapeWithBounds.cs. A constructor of ALine calls a constructor of AShapeWithBounds to initialize the coordinates and size of the bounding box of a line. Assume that Alice has started changing the constructor parameters of AShapeWithBounds ( ) when Bob starts editing ALine ( ). Bob could look at Alice's user-tile 806 to realize she is editing a method he intends to call. However, Bob is not expecting a conflict, so he does not look at it. As soon as he starts editing the constructor, however, a potential conflict is detected and a conflict notification may be sent to Bob and Alice in the manner described previously. It should be noted the roles of Bob and Alice could have been reversed if Bob had edited Aline( ) before Alice edits the AShapeWithBounds( ) constructor. In that case, the conflict would be detected when Alice starts her edits.

Whether a conflict notification is sent will depend on the notification set-up. As described previously, it is possible to specify the granularity and depth of the conflict detection. This can be accomplished by initiating the granularity feature via a drop-down menu list. A granularity pop-up window would appear in the workspace sector 804 and allow the programmer to select either file, type and method, type and method only or method only. The programmer can also choose "none" thereby disabling the conflict notification operation. In addition, the programmer can specify the number of levels from a program element being edited that a related element would still be considered as conflicting. As described previously, it is further possible to delay a conflict notification from being issued until a programmer has edited a prescribed number of elements. This can be accomplished by initiating the delay feature via a drop-down menu list. A delay pop-up window would appear in the workspace sector 804 and allow the programmer to specify the number of edits. In the foregoing operational example, assume the two programmers have not coordinated their activities. They have set the finest granularity to method only and have arranged for conflicts to be reported immediately (i.e., delay=0 edits). Consequently, Bob's first edit to the constructor causes both programmers to get notifications about the potential conflict.

3.2 Conflict Notifications

Figure 9:
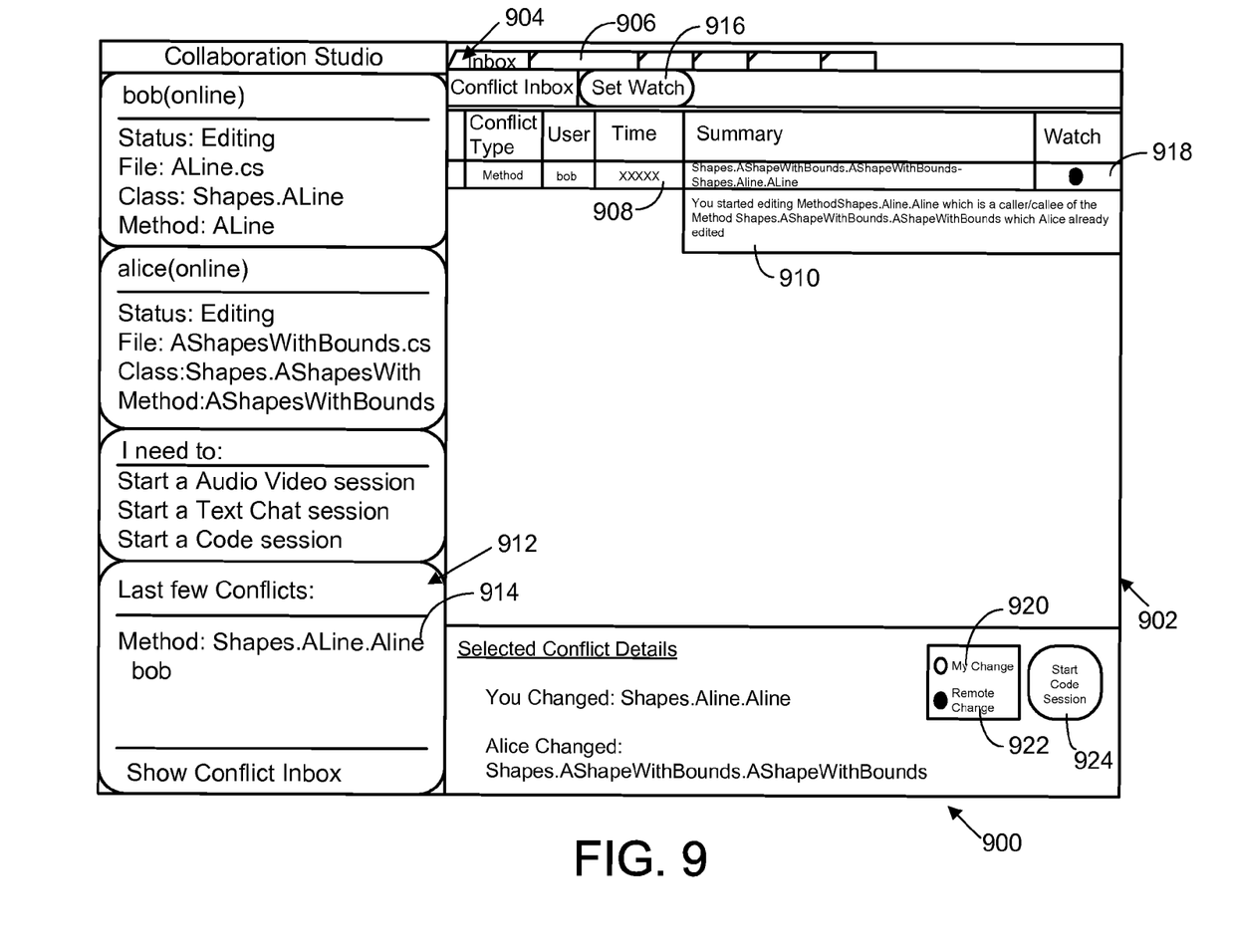
FIG. 9 is a diagram representing an exemplary conflict inbox sub-window as would be seen in the workspace sector of the conflict notification and resolution window.

Conflict notifications can be provided in multiple ways. For instance, in the example GUI of FIG. 8, a conflicts tile 808 is included in the collaboration studio panel 802. When a conflict notification is received, the conflicts tile 808 is updated to list the potential conflict. Further, the conflicts tile 808 can list the last few potential conflicts space permitting. For each listed potential conflict, the program element in which the potential conflict occurs is identified, as is the other programmer involved. As it is possible for a programmer to miss the notification in the conflicts tile 808, additional notification vehicles can be employed as well. For example, a notification balloon that gradually fades away could be displayed in the conflict notification and resolution window 800. Clicking on the notification balloon, double clicking on any potential conflict listed in the conflict tile 808, or clicking on the conflicts inbox button 810 takes the user to a conflict inbox, so called, because it can be considered a persistent collection of conflict messages regarding the current project. FIG. 9 shows one possible configuration of the conflict inbox 904 as it would appear in the workspace sector 902 of the conflict notification and resolution window 900. Note that the inbox 904 appears as a tabbed file overlaying other tabbed sub-windows 906 such as the program elements involved in the conflict. Clicking on a tab brings the associated sub-window to the top. In this way a programmer can quickly go from on sub-window to the next, thereby facilitating the conflict resolution task. The conflict inbox 904 provides a list of detected potential conflicts 908. Clicking on a listed conflict 908 selects it. The selected conflict 908 is highlighted, and a pop-up window 910 appears which provides some details about the potential conflict—such as the program element(s) involved, their relationship and the identity of the other programmer. It is noted that clicking on a potential conflict 914 listed in the conflict tile 912 will also cause the same pop-up window to appear.

3.3 Setting a Watch

To continue with the operational example, once the programmers have been notified of the potential conflict, Bob realizes from the notification that Alice is the middle of changing the called method. He has other changes to make, and therefore, decides he should delay editing his method until Alice has decided what she wants to do with the called method. Therefore, referring to FIG. 9 again, he sets a watch on the conflict by selecting the conflict 908 in the conflict inbox 904 and clicking on the "set watch" button 916. This causes a request watch pop-up window to appear (not shown). The request watch window identified the other programmer involved, i.e., Alice, and the method she is currently editing. Bob can select the mode of the watch to be either by code context or time. If he chooses code context, a message will be sent to Alice requesting that Bob be informed when she finished editing the method. However, if Bob selects the time option, he can designate an amount of time before he is reminded about the conflict. As described earlier, if Bob selects the code context option and Alice grants the watch request, he will be notified when Alice moves away from editing the designated method and starts editing a different program element. It should be noted, however, that the time option has an advantage in that if Alice makes a temporary movement from the method, an erroneous notification that she is done editing it will not be sent—assuming the amount of time specified is sufficient for Alice to complete the editing task. In this operational example, Bob knows that the method Alice is working is simple, and infers that any movement from it will probably be permanent. Therefore, he chooses the code context option. Bob can also enter some text in the watch request window explaining to Alice why her actions must be tracked by him. This text will be added to the watch request message that is sent to Alice. Assume Alice accepts the watch and Bob gets a reply message to that effect. In this case, the watch indicator 918 in the watch column at the end of the potential conflict listing in both Bob and Alice's conflict inbox lights up red indicating an active watch. Once Alice finishes editing the method AShapeWithBounds, Bob receives notification and the watch indicator 918 for the corresponding potential conflict listing 908 in the conflict inboxes 904 changes to green.

3.4 Code Session

Figure 10:
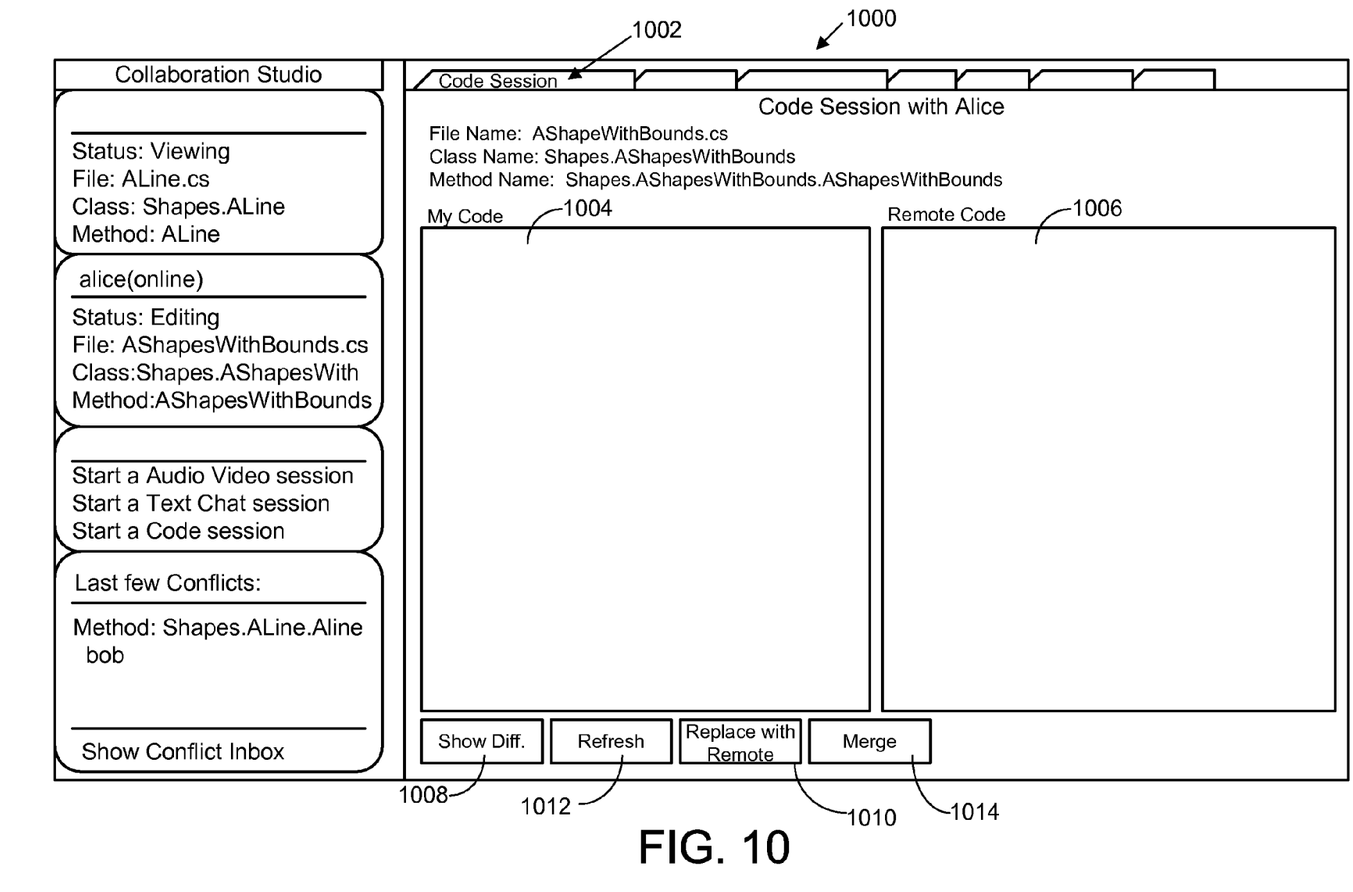
FIG. 10 is a diagram representing an exemplary code session sub-window as would be seen in the workspace sector of the conflict notification and resolution window.

As mentioned before, the present technique only indicates that a potential conflict may exist between program elements—to determine if it is an actual conflict, Bob must actually see what Alice has done. To do so, he selects the potential conflict listing 908 in the conflict inbox 904. In addition, Bob chooses whether to view the other programmer's conflicting program element (i.e., Alice's modified method in this operational example) compared to his version of that element by selecting the "Remote Change" option 920, or to view his conflicting program element (i.e., his modified method in this case) compared to Alice's version of it by selecting the "My Change" option 922. In this example, it will be assumed that Bob elected to go with the remote change option. Bob then initiates a code session by clicking on the "start code session" button 924. This command defines a session for viewing the contents of Alice's modified method in comparison to Bob's version of the method, as the method is known to represent the context of the conflict. However, Bob also has the ability to select a different program element by activating a 3-level code browser (not shown), which allows him to select any file, type (class or interface) within a file, or method within a class for viewing in the code session. It will be assumed that Bob did not specify a different program element. In response to Bob starting the code session, a tabbed code session sub-window 1002 is displayed in the workspace sector 1000 as shown in FIG. 10. The code session sub-window 1002 has two sectors that show the remote version and local version of the program element side by side—namely, the My Code sector 1004 and the Remote Code sector 1006. To locate the exact change causing the potential conflict, Bob can click on a "Show Difference" button 1008 in the code session sub-window 1002. This command shows the difference between two program elements (methods, in this case) by highlighting the lines that have changed.

Bob is now easily able to find the change and adjusts the parameters of his own method when he codes it. As described previously, when Bob re-edits his method he does not get a new conflict notification as the system suppresses a conflict between two program elements of different users if it has earlier flagged a conflict involving the same program elements and users. Once Bob finishes his edits, he needs to test it. However, the code he has written assumes Alice's version of the AShapeWithBounds( ) method, while his testing workspace has the old version. Thus, he needs to incorporate Alice's changes in this version to test his code. To accomplish this, Bob clicks on a "Replace With Remote" button 1010 found in the code session sub-window 1002. This command incorporates Alice's changes to the conflicting method as they are shown in the code session sub-window 1002, in Bob's version of the method. It is noted that this action does not result in conflict notifications, as explained previously.

It is also noted that the previously described refresh command can be initiated by clicking on a "Refresh" button 1012 in the code session window. This obtains and displays the latest local and remote versions of the program element being compared in the code session. So, in this operational example, Bob can wait till Alice finishes her changes, then execute the refresh command, followed by a replace with remote command to get Alice's changes into his code. Similarly, the previously described merge feature can be initiated by clicking on a "Merge" button 1014 in the code session window 1002.

3.5 Communication Sessions

If a programmer wishes to resolve a potential conflict with another programmer directly, this can be done using the previously described communication session features—such as in-place audio/video, text chat and application sharing. For example, assume that Bob cannot wait until Alice is finished editing the potentially conflicting method, and so a code session is not available. Or, assume that Bob wishes to communicate with Alice during a code session to aid in resolving the conflict. Referring to FIG. 8 once again, the in-place communication channels can be initiated from an "I Need" tile 812 in the collaboration studio panel 802. For example, Bob could click on a "Start A Audio/Video Session" and/or a "Start A Text Chat Session" item listed in the "I Need" tile 812. In the example GUI, for each communication channel selected, a tile (not shown) is added to the collaboration studio panel to provide the desired communication session. There may also be situations where conflict resolution requires the two programmers to work together on some code. To accomplish this, a programmer can initiate an application-sharing session by clicking on a "Start An Application Sharing Session" in the "I Need" tile 812 in the collaboration studio panel 802. In the application sharing session, the two programmers can both control the conflict notification and resolution window 800, one at a time.

It is noted that if a conflict is resolved by changing a program element outside a code session, the program elements can still be compared, replaced with the latest version, merged and so on by initiating a code session afterwards.

4.0 Other Embodiments

In the foregoing description of embodiments for the present code conflict notification and resolution technique, potential conflicts were detected for an edited program element that had not yet been checked-in for validation and testing. However, the technique can be extended to detect potential conflicts involving program elements that have already been checked in. In such a case, the programmer will not be able to start a code session and so would use the version control system to view, incorporate and adapt to the changes of the other programmer.

Further, while the foregoing description of embodiments of the present invention referred to notification and resolution of computer code conflicts, the technique has application beyond just this implementation. For example, the present technique could be applied to a network-based, collaborative document preparation project. In such an implementation conflicts would be detected between some specified portion of the text (e.g., line, sentence, paragraph, and so on) rather than the previously described program elements, and the document preparers (instead of programmers) involved in the conflict would be notified accordingly. Generally, all the features described above would be useful in this alternate implementation. Still further, the present technique could generally be applied to any network-based, collaborative development project where developers may be working on the same or related element and where conflicts could occur.

It should also be noted that any or all of the aforementioned embodiments throughout the description may be used in any combination desired to form additional hybrid embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Wherefore, what is claimed is:

1. A computer-implemented network-based process for conflict detection and notification, comprising using a computer to perform the following process actions:
   maintaining a list of edited project elements associated with a development project, each of said edited project elements having been previously edited by a first developer and representing an edited version of a previously created project element;
   maintaining a list of related project elements which relate to the edited project elements, each of said related project elements being different from the edited project element it is related to and previously created versions of the edited project element it is related to, but having a dependency that exists between the related project element and the edited project element it is related to, and said related project elements list indicating, for each related project element, the edited project element it is related to, and exclusively listing only related project elements which relate to the edited project elements;
   inputting an edit message identifying a project element associated with the project that a second developer is changing;
   determining if the edit message identifies one of the edited project elements, using said list of edited project elements;
   determining if the edit message identifies a project element that is related to an edited project element, using the related project elements list;
   whenever the edit message identifies one of the edited project elements, notifying the first and second developers of a potential conflict; and
   whenever the edit message identifies a project element that is related to an edited project element, notifying the first and second developers of a potential conflict between the edited project element and the project element identified in the edit message.

2. The process of claim 1, wherein the conflict is between program elements of a computer code being developed in a software development project by two or more programmers and so the project elements are program elements and the developers are programmers, and wherein the process action of notifying the second programmer of the potential conflict, comprises transmitting, via the network, a conflict message to the second programmer which identifies that the potential conflict exists between the first programmer's version of a program element and the second programmer's version of that element.

3. The process of claim 2, further comprising a process action of whenever a program element is being created rather than an existing one being changed by the second programmer, the edit message also identifies a program element or elements that are related to the program element being created.

4. The process of claim 2, the process action of notifying the second programmer of the potential conflict, comprises transmitting, via the network, a conflict message to the second programmer which identifies that the potential conflict exists between the edited program element and the program element identified in the edit message.

5. The process of claim 2, wherein each of said program elements comprises at least one of a file, a type comprising a class or interface, and a method.

6. The process of claim 5, wherein a related program element relates to an edited program element not only based on its dependency, but also based on a prescribed depth of dependency from the edited program element.

7. The process of claim 2, wherein the process actions of notifying the first and second programmers of a potential conflict is delayed until after the program element identified in the edit message is finished being created or the change being made thereto is complete.

* * * * *